United States Patent

Kodama et al.

[11] Patent Number: 6,027,554
[45] Date of Patent: Feb. 22, 2000

[54] POLISHING COMPOSITION

[75] Inventors: Hitoshi Kodama; Satoshi Suzumura; Noritaka Yokomichi; Shirou Miura; Hideki Otake; Atsunori Kawamura; Masatoki Ito, all of Aichi, Japan

[73] Assignee: Fujimi Incorporated, Aichi, Japan

[21] Appl. No.: 08/949,776

[22] Filed: Oct. 14, 1997

Related U.S. Application Data

[63] Continuation of application No. 08/789,541, Jan. 27, 1997, Pat. No. 5,733,819.

[30] Foreign Application Priority Data

Jan. 29, 1996 [JP] Japan ................................ 8-12592
Sep. 13, 1996 [JP] Japan ................................ 8-243196
Sep. 13, 1996 [JP] Japan ................................ 8-243421

[51] Int. Cl.$^7$ .............................. C09K 3/14; B24B 1/00
[52] U.S. Cl. .................... 106/3; 51/307; 51/308; 438/692; 438/693
[58] Field of Search ................... 106/3; 438/692, 438/693; 216/89; 51/307, 308

[56] References Cited

U.S. PATENT DOCUMENTS

| | | | |
|---|---|---|---|
| 4,057,939 | 11/1977 | Basi ............................................ | 106/3 |
| 5,084,071 | 1/1992 | Neadic et al. ............................. | 61/309 |
| 5,354,490 | 10/1994 | Yu et al. ................................. | 252/79.1 |
| 5,525,191 | 6/1996 | Maniar et al. ....................... | 156/636.1 |
| 5,527,423 | 6/1996 | Neville et al. .............................. | 106/3 |

FOREIGN PATENT DOCUMENTS

| | | |
|---|---|---|
| 0401147 | 12/1990 | European Pat. Off. . |
| 0773269 | 5/1997 | European Pat. Off. . |
| 0781822 | 7/1997 | European Pat. Off. . |

OTHER PUBLICATIONS

Metals Handbook, 9th ed, vol. 9, pp. 35 and 39–40, Sep. 2, 1982.

JP5–231602 –Abstract –917193

JP6–2057470 –Abstract –613185

DE4314310 –Abstract –4130193

*Primary Examiner*—Melissa Koslow
*Attorney, Agent, or Firm*—Oblon, Spivak, McClelland, Maier & Neustadt, P.C.

[57] ABSTRACT

A polishing composition comprising silicon nitride fine powder, water and an acid.

7 Claims, No Drawings

POLISHING COMPOSITION

This is a continuation of application Ser. No. 08/789,541 filed on Jan. 27, 1997, now U.S. Pat. No. 5,733,819.

The present invention relates to a polishing composition useful for polishing semiconductors, photomasks, substrates for various memory hard disks and various industrial products such as synthetic resins, or parts thereof. Particularly, it relates to a polishing composition suitable for use for planarization polishing of the surface of device wafers in the semiconductor industries. More particularly, the present invention relates to a polishing composition having good redispersibility and high purity, which provides a high stock removal rate and is capable of forming an excellent polished surface in polishing metal wirings or interlayer dielectrics to which a chemical mechanical polishing technique has heretofore been applied, and which at the same time is applicable to isolation of elements and other high level integrated circuit fabrication.

The progress in so-called high technology products including computers has been remarkable in recent years, and with respect to parts such as ULSI to be used for such products, there has been a continuous progress for high density and high speed year by year. Accordingly, in the design rule for semiconductor devices, narrowing of wirings has progressed year by year, so that the depth of focus in a process for producing devices has become shallow and the requirement for flatness of the pattern-forming surface has become severe.

Further, to cope with an increase of the wiring resistance due to narrowing of wirings, stacking of devices is carried out to shorten the wiring length, but the step height of the formed pattern surface has been problematic as a hindrance against stacking.

Accordingly, to carry out such narrowing and stacking, it is necessary to carry out planarization of the desired surface to remove the step height in the process. For the planarization, spin on glass, resist etch back or other planarization methods have heretofore been employed.

However, by such conventional methods, it is difficult to attain global planarization (complete planarization) which is required for advanced devices, although partial planarization is possible. Accordingly, a chemical mechanical polishing (hereinafter referred to simply as "CMP") for planarization has now been studied, which is a combination of mechanical or physical polishing and chemical polishing.

On the other hand, a study is being made to apply the CMP technique to planarization of an interlayer dielectric such as a silicon dioxide film, a wiring material such as an aluminum, tungsten or copper film, or a polysilicon film, to separation of elements and to other applications. A shallow trench isolation method may be mentioned as one of methods for isolation of elements, which have been studied in recent years. This method comprises forming a shallow trench in silicon, forming a silicon dioxide film thereon, followed by planarization by the CMP technique, whereby isolation of elements can be made in a narrower area, and it has attracted an attention as a technique useful for densification of semiconductor devices.

Technical objectives in carrying out the shallow trench isolation are to uniformly finish without excessive or insufficient stock removal by polishing the surface for planarization and to complete the polishing at a predetermined level of stock removal. Usually, it is common to provide a harder silicon nitride film beneath a silicon dioxide film to be polished, so that the silicon nitride film serves as a stopper during the polishing. It should readily be understood that as a polishing agent to be used here, it is preferred to employ a polishing agent which is capable of efficiently polishing the silicon dioxide film and which, on the other hand, is incapable of polishing the silicon nitride film.

Usually, as an index for susceptibility to polishing of the silicon dioxide film over the silicon nitride film, selectivity for polishing (hereinafter referred to as "the selectivity") is used, which is the ratio of the rate at which the silicon dioxide film is polished by the polishing agent to the rate at which the silicon nitride film is polished by the same polishing agent. This selectivity is obtained by dividing the rate at which the silicon dioxide film is polished by the polishing agent by the corresponding rate at which the silicon nitride film is polished.

As is evident from the definition of this selectivity, even if the rate for polishing the silicon nitride film by a polishing agent is constant, the selectivity becomes high as the rate for polishing the silicon dioxide film becomes high. Likewise, even if the rate for polishing the silicon dioxide film is constant, the selectivity becomes high as the rate for polishing the silicon nitride film becomes low. Needless to say, a polishing agent is desired whereby the rate for polishing the silicon nitride film is close to 0, and the rate for polishing the silicon dioxide film is as high as possible.

Accordingly, even if the rate for polishing the silicon dioxide film is high, the one whereby the rate for polishing the silicon nitride film is high, is not required irrespective of how high the selectivity is. As the silicon nitride film is expected to be a stopper to stop polishing, the one having high selectivity and a rate for polishing the silicon nitride film being close to 0, is practically useful, even if the rate for polishing the silicon dioxide film is rather low.

Usually, the silicon dioxide film is formed in a thickness of from about 5,000 to 6,000 Å. Whereas, the rate for polishing the silicon dioxide film with a usual polishing composition is from a few thousands Å/min. Accordingly, with a polishing composition having a high rate for polishing the silicon dioxide film, the silicon dioxide film will be removed in a very short period of time after initiation of the polishing. In a case where a wafer having a silicon dioxide film formed on a silicon nitride film, is polished with a polishing composition, it is necessary to stop polishing precisely immediately after the removal of the silicon dioxide film, otherwise polishing will extend to the silicon nitride film as the stopper. In most cases, the rate for polishing the silicon nitride film with the polishing composition is not 0. Accordingly, if polishing is continued after removal of the silicon dioxide film, even the silicon nitride film will also be polished, and in an extreme case, will be completely removed. As is evident from the foregoing, it is very important to detect the end point in the CMP treatment, and a polishing composition having a polishing rate suitable for the process i.e. within a range where the end point can accurately be detected, has been desired.

For example, in a case of polishing a wafer having a silicon dioxide film formed on a silicon nitride film, it is necessary to terminate the polishing of the silicon dioxide film when the silicon nitride film has been partially exposed. This timing is called "the end point", and detection of this end point is called "the end point detection". Various studies have been made on the method for detecting the end point. For example, a method of measuring the thickness of the remaining film during the polishing by irradiating a laser beam to the wafer from below the polishing table, and other methods have been proposed. However, none of such proposals has been practically useful. Accordingly, it is common to use a method wherein the time required for removing a certain predetermined thickness of silicon dioxide film is calculated from the polishing rate which the polishing composition has, and polishing is carried out within the predetermined period of this calculated time, taking this as the end point.

To obtain a certain specific selectivity for a particular production process, it is common to adjust the selectivity by adjusting the amount of a polishing accelerator. However, such adjustment has not been easy, since the selectivity may substantially change even by an addition of a small amount of an acid, and it has been difficult to obtain a constant selectivity or polishing rate.

On the other hand, a polishing composition having a polishing agent dispersed in water or in other liquid, undergoes separation, as the time passes, into a cake portion, a suspension portion wherein the polishing agent is dispersed and a supernatant portion wherein substantially no polishing agent is present. Depending upon the composition of the polishing composition, there may be a case where no suspension portion will form, i.e. the one which undergoes separation into a cake portion and a supernatant portion only.

Redispersibility of a polishing composition is an index for how readily the cake settled at the bottom of the container will be dispersed when the container is shaked. Accordingly, the composition wherein the cake is readily dispersible, can be said to have good redispersibility. On the other hand, with the one having poor redispersibility, the polishing agent settled relatively firmly during the storage tends to form a close-packed structure and thus forms a cake i.e. an agglomerate of the polishing agent settled at the bottom of the container, whereby sometimes the cake may not be sufficiently dispersed, or aggregates or coarse particles of the fine powder may form, which cause scratching of the surface to be polished. Further, with the polishing composition having poor redispersibility, once settled, the cake can hardly be redispersed, whereby an exclusive installation, man power and time will be required for dispersing the slurry. Accordingly, a polishing composition having good redispersibility has been desired.

As an agent for improving redispersibility, celluloses, saccharides and other organic substances, polymer flocculants, or oxide sols or gels and other inorganic substances, have been widely used. However, organic substances have had problems such as rottenness and a decrease in the polishing rate. Further, many conventional agents for improving redispersibility have had a problem that they contain substantial amounts of metal impurities. Therefore, many of them have not been suitable as polishing compositions to be used for the CMP treatment.

The present invention has been made to solve the above problems, and it is an object of the present invention to provide a polishing composition which is useful for the CMP treatment and which has high purity, high selectivity, excellent surface condition and other basic polishing properties, which have been desired for a polishing composition.

Another object of the present invention is to provide a polishing composition whereby the rate for polishing the silicon nitride film can be lowered, the selectivity can be adjusted, redispersion of the precipitate is easy even after storage for a long period of time and scratching of the surface to be treated can be prevented.

The present invention provides a polishing composition comprising silicon nitride fine powder, water and an acid.

The polishing composition of the present invention has a high rate for polishing a silicon dioxide film as compared with the rate for polishing a silicon nitride film, whereby it is possible to obtain relatively high selectivity.

The polishing composition of the present invention may further contain at least one member selected from the group consisting of fumed titania, fumed zirconia, fumed alumina and fumed silica. By the addition of fumed titania, fumed zirconia, fumed alumina or fumed silica, the rate for polishing a silicon nitride film can further be lowered, and the selectivity can be adjusted by the amount of the addition. Further, redispersibility of the precipitate after storage for a long period of time is good, whereby the exclusive installation, man power and time which used to be required for dispersing the settled cake after the storage, will no longer be required. Furthermore, aggregates or coarse particles are scarcely formed, whereby formation of scratch marks or other surface defects on the surface to be polished, can be prevented.

Now, the present invention will be described in further detail with reference to the preferred embodiments.

Silicon nitride fine powder

The silicon nitride to be used as the main polishing agent among the components constituting the polishing composition of the present invention is not particularly limited, and it may, for example, be α-silicon nitride, β-silicon nitride or amorphous silicon nitride from the viewpoint of its morphology. Otherwise, it may be a mixture of these fine powders in optional proportions.

The silicon nitride fine powder serves as abrasive grains to polish the surface to be polished by the mechanical effects. The particle size of this silicon nitride fine powder is usually from 0.01 to 10 μm, preferably from 0.05 to 3 μm, as the mean primary particle size as measured by a BET method. If the mean primary particle size exceeds 10 μm, there will be problem such that the surface roughness of the polished surface is substantial, or scratching is likely to result. On the other hand, if it is smaller than 0.01 μm, the polishing rate tends to be extremely low and impractical.

The content of the silicon nitride fine powder in the polishing composition is usually from 0.1 to 50 wt %, preferably from 1 to 25 wt %, based on the total amount of the composition. If the content of the silicon nitride fine powder is too small, the polishing rate becomes low, and if it is too much, the uniform dispersion can not be maintained, and the viscosity of the composition will be so high that the handling tends to be difficult.

Water

The water to be used in the present invention is not particularly limited, and it may, for example, be industrial water, city water, deionized water, distilled water or ultra-pure water. The content of the water in the polishing composition is usually from 30 to 99.899 wt %, preferably from 65 to 98.995 wt %.

Acid

The acid serves to polish the surface to be polished by a chemical action. The useful acid may be an organic acid or an inorganic acid. The type of the acid to be used is not particularly limited so long as it does not impair the effects of the present invention. As the organic acid, a carboxylic acid, particularly a hydroxycarboxylic acid, is preferred. Among carboxylic acids, particularly preferred are gluconic acid, lactic acid, citric acid, tartaric acid, malic acid, glycolic acid, malonic acid, formic acid and oxalic acid. Among inorganic acids, hydrochloric acid and nitric acid are particularly preferred. These acids may be used in combination, as the case requires.

The content of such an acid is usually from 0.001 to 20 wt %, preferably from 0.005 to 10 wt %, based on the total amount of the polishing composition, although it may vary depending upon the strength of the acid. By an addition of a certain amount of an acid, the effects of the present invention will appear distinctly. On the other hand, even if the amount is increased too much, no further improvement in the effects will be obtained, and such is uneconomical. Further, by the addition of the acid, the pH of this polishing composition will usually become not higher than 7. The pH of the polishing composition may vary by an addition of various additives, but to obtain the effects of the present invention, it is preferred to maintain the pH at a level of not higher than 7.

Fumed titania/fumed zirconia/fumed alumina/fumed silica

The polishing composition of the present invention preferably contains fumed titania, fumed zirconia, fumed alumina or fumed silica. Such additive is incorporated for the purpose of improving the redispersibility of the polishing composition and adjusting the selectivity by lowering the rate for polishing a silicon nitride film. The fumed titania, fumed zirconia, fumed alumina and fumed silica to be used in the present invention are those prepared by high temperature heat decomposition of respective heat decomposable precursor compounds, such as halides, particularly chlorides, capable of presenting the respective oxides.

Fumed titania can be produced, for example, by burning titanium tetrachloride and hydrogen in air. The reaction formula may be shown as follows:

$$TiCl_4 + 2H_2 + O_2 \rightarrow TiO_2 + 4HCl$$

Such fumed titania is in the form of aggregate secondary particles of a chain structure having from a few to a few tens fine primary particles aggregated to one another. Such fumed titania is commercially available, for example, in a tradename of Titanium Dioxide P25 from Nippon Aerosil K.K.

The fumed zirconia, the fumed alumina and the fumed silica, for example, can also be produced by burning the respective tetrachlorides and hydrogen in air, in the same manner as for the fumed titania. These reactions may be represented as follows.

$$ZrCl_4 + 2H_2 + O_2 \rightarrow ZrO_2 + 4HCl$$

$$4AlCl_4 + 6H_2 + 3O_2 \rightarrow 2Al_2O_3 + 12HCl$$

$$SiCl_4 + 2H_2 + O_2 \rightarrow SiO_2 + 4HCl$$

The respective particles are likewise in the form of aggregate secondary particles of a chain structure having from a few to a few tens fine primary particles aggregated, like the fumed titania. Such fumed zirconia is available, for example, as a test sample from Nippon Aerosil K.K. Further, the fumed alumina and fumed silica are commercially available, for example, in tradenames of Aluminum Oxide C and Aerosil, respectively, from Nippon Aerosil K.K.

The content of the fumed titania, fumed zirconia, fumed alumina or fumed silica to be used in the present invention, is usually from 0.0002 to 50,000 wt %, preferably from 0.004 to 2,500 wt %, based on the weight of the silicon nitride fine powder. Further, it is usually from 0.0001 to 50 wt %, preferably from 0.001 to 25 wt %, based on the total amount of the polishing composition. Within this range, fumed titania, fumed zirconia, fumed alumina and fumed silica may be used in combination. If the content is too small, the effects of the present invention tend to be hardly obtainable. On the other hand, if it is too much, the uniform dispersion can not be maintained, and the viscosity of the composition will be so high that the handling tends to be difficult.

Details of the mechanism for such excellent polishing effects of the polishing composition of the present invention are not known. However, it is considered that the presence of an acid is somehow influential over the dispersed state of the silicon nitride fine powder in the polishing composition, and such a dispersed state serves advantageously in the polishing process.

Further, details of the mechanism are not known for the effect such that by the addition of fumed titania, fumed zirconia, fumed alumina or fumed silica, the rate for polishing a silicon nitride film lowers, and excellent redispersibility is obtainable. However, it is considered that the aggregation/dispersion condition between the silicon nitride fine powder and the fumed titania, fumed zirconia, fumed alumina or fumed silica of a chain structure present therearound, serves advantageously in the polishing process.

Polishing composition

The polishing composition of the present invention is prepared usually by mixing a desired amount of the silicon nitride fine powder to water, and adding a predetermined amount of an acid thereto while dispersing the mixture. Further, a predetermined amount of at least one member selected from the group consisting of fumed titania, fumed zirconia, fumed alumina and fumed silica is preferably dispersed. The above respective components are uniformly dispersed in this composition to form a polishing composition in the form of a suspension. These components may be dispersed in water by any optional method and may be dispersed, for example, by stirring by an agitator or by ultra supersonic dispersion.

Further, in the preparation of the polishing composition, various conventional additives may further be added, as the case requires, depending upon the type of the object to be polished, the polishing conditions and other requirements for polishing, for the purpose of stabilization or quality maintenance of the product.

Typical examples of such additives include (a) silicon dioxides other than fumed silica, such as colloidal silica, precipitated silica and others, (b) celluloses, such as cellulose, carboxymethyl cellulose and hydroxyethyl cellulose, (c) water-soluble alcohols, such as ethanol, propanol and ethylene glycol, (d) surfactants, such as a sodium alkylbenzene sulfonate and a condensation product of formalin with naphthalene sulfonic acid, (e) organic polyanion type substances, such as a lignin sulfonate and a polyacrylate, (f) inorganic salts, such as ammonium sulfate, magnesium sulfate, magnesium chloride, potassium acetate and aluminum nitrate, (g) water-soluble polymers (emulsifiers), such as polyvinyl alcohol, and (h) aluminum oxides other than fumed alumina, such as alumina sol and others.

For the preparation of the polishing composition of the present invention, the mixing method and the order of mixing the various additives are not particularly limited.

The polishing composition of the present invention may be prepared in the form of a stock solution having a relatively high concentration, which may be stored or transported and which is diluted for use at the time of actual polishing operation. The above-mentioned preferred ranges of concentration are those for actual polishing operation. Accordingly, when the composition is stored or transported in the form of a stock solution, such a stock solution is prepared to have a higher concentration.

The polishing composition of the present invention prepared as described above, is excellent in redispersibility and free from scratching by aggregated particles, and thus, it is useful for polishing semiconductor devices, photomasks, substrates for various memory hard disks, synthetic resins, etc. However, it is particularly suitable for use in the CMP treatment of wafers in the semiconductor industry, since it has a high rate for polishing a silicon dioxide film and a low rate for polishing a silicon nitride film, and it has high selectivity which is adjustable.

Now, the polishing composition of the present invention will be described in further detail with reference to Examples. However, it should be understood that the present invention is by no means restricted to such specific Examples.

EXAMPLES 1 to 23 and COMPARATIVE EXAMPLES 1 to 17

Preparation of polishing compositions

Firstly, the following polishing agents were, respectively, dispersed in water by an agitator to obtain slurries each having a polishing agent concentration of 10 wt %. Then, to these slurries, various acids were mixed in the amounts as shown in Table 1 to obtain samples of Comparative Examples 1 to 16.

Fumed silica (mean primary particle size: 0.05 $\mu$m)
Cerium oxide (mean primary particle size: 0.98 $\mu$m)
Aluminum oxide (mean primary particle size: 0.07 $\mu$m)
Chromium oxide (mean primary particle size: 0.20 $\mu$m)
Zirconium oxide (0.20 $\mu$m)
Silicon carbide (mean primary particle size: 0.60 $\mu$m)
$\alpha$-silicon nitride fine powder (mean primary particle size: 0.12 $\mu$m)

In Comparative Example 17, the slurry of $\alpha$-silicon nitride fine powder was left to stand for 3 months and then evaluated.

Further, the $\alpha$-silicon nitride fine powder was dispersed in water by an agitator to obtain slurries having a polishing agent concentration of 10 wt %, and various acids were added and mixed thereto in the amounts as shown in Table 2 to obtain samples of Examples 1 to 11.

Still further, samples of Examples 12 to 23 were prepared by adding 1 wt % of glycolic acid and fumed titania (Titanium Dioxide P-25, tradename, 50 m$^2$/g, manufactured by Nippon Aerosil K.K.), fumed zirconia (test sample, 40 m$^2$/g, manufactured by Nippon Aerosil K.K.), fumed alumina (Aluminum Oxide C, tradename, 100 m$^2$/g, manufactured by Nippon Aerosil K.K.) or fumed silica (Aerosil 90, 900 m$^2$/g, manufactured by Nippon Aerosil K.K.) in the amount as shown in Table 2, to a slurry containing 10 wt % of the $\alpha$-silicon nitride fine powder prepared in the same manner as described above.

Redispersibility test

With respect to the samples of Examples 1 to 23 and Comparative Examples 1 to 17, a redispersibility test was carried out under the following conditions.

(1) 100 cc each of the sufficiently dispersed samples were, respectively, put into 100 cc color comparison tubes.

(2) With respect to Examples 1 to 23 and Comparative Examples 1 to 16, the samples were left to stand for 2 weeks, and with respect to Comparative Example 17, the sample was left to stand for 3 months. With respect to each sample, the solid content was settled to form a cake at the bottom of the color comparison tube. Each sample was shaked under the same conditions with respect to amplitude, speed and direction until the cake was uniformly dispersed.

(3) With respect to each sample, the redispersibility was evaluated based on the number of shaking times required for the dispersion.

With respect to settled aggregate particles, each prepared slurry was diluted 50 times and gently stirred, followed by filtration by means of a nylon net, whereby the residue remaining on the nylon net was inspected.

The results are shown in Tables 1 and 2.

Polishing test

Then, a polishing test was carried out by means of the samples of Examples 1 to 23 and Comparative Examples 1 to 17 which were subjected to the above redispersibility test.

As the objects to be polished, a 6 inch silicon wafer having a silicon dioxide film formed by a thermal oxidation method and a 6 inch silicon wafer having a silicon nitride film formed by a low pressure chemical vapor deposition (LPCVD) method were used (each of the silicon wafers had an outer diameter of about 150 mm). The silicon dioxide film side and the silicon nitride film side of the wafers were polished.

Polishing was carried out by means of a single side polishing machine (table diameter: 570 mm). A stacked polishing pad made of polyurethane (IC-1000/Suba 400, manufactured by Rodel Company, U.S.A.) was bonded to the table of the polishing machine. Firstly, the wafer provided with the silicon dioxide film was mounted and polished for 1 minute, and then the wafer was changed to the wafer provided with the silicon nitride film, which was polished for 1 minute in the same manner.

The polishing conditions were such that the polishing pressure was 490 g/cm$^2$, the rotational speed of the polishing table was 30 rpm, the feeding rate of the polishing agent was 150 cc/min, and the rotational speed of the wafer was 30 rpm.

After the polishing, the wafers were sequentially washed and dried, whereupon the reduction in the film thickness of the wafer by polishing was measured with respect to 49 samples, and the polishing rate was obtained for each test.

Further, the selectivity was obtained by dividing the rate at which the silicon dioxide film was polished by the rate at which the silicon nitride film was polished.

With respect to scratch, after polishing, each wafer was washed and dried, whereupon the presence or absence of scratch marks were visually observed under a spotlight in a dark room.

The results are shown in Tables 1 and 2.

TABLE 1

| | | | | Polishing rate | | | | | |
| Comparative Examples | Polishing agent | Acid | Amount (g/l) | SiO$_2$ film (nm/min) | Si$_3$N$_4$ film (nm/min) | Selectivity SiO$_2$/Si$_3$N$_4$ | Redispersibility | Settled aggregate particles | Scratch |
| --- | --- | --- | --- | --- | --- | --- | --- | --- | --- |
| 1 | Fumed silica | — | — | 65 | 15 | 4.3 | 1 | Much | x |
| 2 | Fumed silica | Potassium hydroxide | 6 | 200 | 42 | 4.8 | 1 | Much | x |
| 3 | Fumed silica | Malic acid | 10 | 159 | 79 | 2.0 | 1 | Much | x |

TABLE 1-continued

| Comparative Examples | Polishing agent | Acid | Amount (g/l) | Polishing rate SiO₂ film (nm/min) | Polishing rate Si₃N₄ film (nm/min) | Selectivity SiO₂/Si₃N₄ | Redispersibility | Settled aggregate particles | Scratch |
|---|---|---|---|---|---|---|---|---|---|
| 4 | Cerium oxide | — | — | 353 | 232 | 1.5 | 1 | Much | x |
| 5 | Cerium oxide | Potassium hydroxide | 6 | 1,016 | 232 | 4.4 | 1 | Much | x |
| 6 | Cerium oxide | Oxalic acid | 10 | 315 | 126 | 2.5 | 1 | Much | x |
| 7 | Cerium oxide | Malic acid | 10 | 19 | | | 1 | Much | x |
| 8 | Aluminum oxide | — | — | 23 | | — | 1 | Much | x |
| 9 | Chromium oxide | — | — | 289 | 54 | 5.4 | 1 | Much | x |
| 10 | Zirconium oxide | — | — | 212 | 144 | 1.5 | 1 | Much | x |
| 11 | Zirconium oxide | Potassium hydroxide | 3 | 298 | 119 | 2.5 | 1 | Much | x |
| 12 | Zirconium oxide | Malic acid | 10 | 19 | — | — | 1 | Much | x |
| 13 | Zirconium oxide | Oxalic acid | 10 | 97 | 65 | 1.5 | 1 | Much | x |
| 14 | Silicon carbide | — | — | 35 | — | | 1 | Much | x |
| 15 | Silicon nitride | — | — | 318 | 84 | 3.8 | 1 | Much | x |
| 16 | Silicon nitride | Potassium hydroxide | 6 | 303 | 51 | 5.9 | 1 | Much | x |
| 17 | Silicon nitride | Glycolic acid | 1 | 670 | 43 | 15.5 | 1 | Much | x |

TABLE 2

| Examples | Polishing agent | Acid | Amount (g/l) | Additive | Amount (g/l) | Polishing rate SiO₂ film (nm/min) | Polishing rate Si₃N₄ film (nm/min) | Selectivity SiO₂/Si₃N₄ | Redispersibility | Settled aggregate particles | Scratch |
|---|---|---|---|---|---|---|---|---|---|---|---|
| 1 | Silicon nitride | Malic acid | 10 | — | — | 577 | 35 | 16.4 | 1 | Little | Δ |
| 2 | Silicon nitride | Formic acid | 10 | — | — | 848 | 94 | 9.1 | 1 | Little | Δ |
| 3 | Silicon nitride | Gluconic acid | 10 | — | — | 695 | 17 | 41.4 | 1 | Little | Δ |
| 4 | Silicon nitride | Lactic acid | 10 | — | — | 611 | 19 | 32.5 | 1 | Little | Δ |
| 5 | Silicon nitride | Glycolic acid | 10 | — | — | 670 | 43 | 15.5 | 1 | Little | Δ |
| 6 | Silicon nitride | Citric acid | 10 | — | — | 606 | 24 | 25.4 | 1 | Little | Δ |
| 7 | Silicon nitride | Tartaric acid | 10 | | | 533 | 33 | 16.3 | 1 | Little | Δ |
| 8 | Silicon nitride | Malonic acid | 10 | — | — | 550 | 45 | 12.1 | 1 | Little | Δ |
| 9 | Silicon nitride | Oxalic acid | 0.1 | — | — | 566 | 68 | 8.3 | 1 | Little | Δ |
| 10 | Silicon nitride | Nitric acid | 0.1 | — | — | 757 | 80 | 9.5 | 1 | Little | Δ |
| 11 | Silicon nitride | Hydrochloric acid | 0.1 | — | — | 763 | 86 | 8.9 | 1 | Little | Δ |
| 12 | Silicon nitride | Glycolic acid | 1 | Fumed titania | 5 | 419 | 26 | 16.2 | 5 | Nil | ◎ |
| 13 | Silicon nitride | Glycolic acid | 1 | Fumed titania | 15 | 313 | 18 | 17.0 | 5 | Nil | ◎ |
| 14 | Silicon nitride | Glycolic acid | 1 | Fumed titania | 45 | 265 | 20 | 13.2 | 5 | Nil | ◎ |
| 15 | Silicon nitride | Gluconic acid | 1 | Fumed zirconia | 5 | 458 | 23 | 19.6 | 5 | Nil | ◎ |
| 16 | Silicon nitride | Gluconic acid | 1 | Fumed zirconia | 15 | 337 | 20 | 17.3 | 5 | Nil | ◎ |

TABLE 2-continued

| | | | | | Polishing rate | | | | | |
|---|---|---|---|---|---|---|---|---|---|---|
| Examples | Polishing agent | Acid | Amount (g/l) | Additive | Amount (g/l) | $SiO_2$ film (nm/min) | $Si_3N_4$ film (nm/min) | Selectivity $SiO_2/Si_3N_4$ | Redispersibility | Settled aggregate particles | Scratch |
| 17 | Silicon nitride | Glycolic acid | 1 | Fumed zirconia | 45 | 267 | 17 | 15.7 | 5 | Nil | ⊙ |
| 18 | Silicon nitride | Glycolic acid | 1 | Fumed alumina | 5 | 465 | 72 | 6.5 | 3 | Nil | ⊙ |
| 19 | Silicon nitride | Glycolic acid | 1 | Fumed alumina | 15 | 401 | 69 | 5.8 | 3 | Nil | ⊙ |
| 20 | Silicon nitride | Glycolic acid | 1 | Fumed alumina | 45 | 296 | 49 | 6.0 | 3 | Nil | ○ |
| 21 | Silicon nitride | Glycolic acid | 1 | Fumed silica | 5 | 658 | 79 | 8.3 | 3 | Nil | ⊙ |
| 22 | Silicon nitride | Glycolic acid | 1 | Fumed silica | 15 | 637 | 80 | 8.0 | 3 | Nil | ⊙ |
| 23 | Silicon nitride | Glycolic acid | 1 | Fumed silica | 45 | 588 | 75 | 7.9 | 3 | Nil | ⊙ |

The redispersibility was evaluated under the following standards:
1: The cake was not dispersed even when shaken at least 20 times.
2: The cake was dispersed with some difficulty, when shaken from 15 to 20 times.
3: The cake was dispersed when shaken from 11 to 15 times.
4: The cake was dispersed when shaken from 6 to 10 times.
5: The cake was dispersed when shaken from 1 to 5 times.

The scratch was evaluated under the following standards:
⊙: No scratch marks were visually observed.
○: No substantial scratch marks were visually observed.
Δ: Some scratch marks were visually observed.
×: Substantial scratch marks were visually observed.

It is evident from the results shown in Tables 1 and 2 that with the polishing compositions of Examples 1 to 11 of the present invention, the rate for polishing a silicon dioxide film is substantially higher than that in Comparative Examples except for Comparative Example 17, and the selectivity in each Example is substantially improved over that in Comparative Examples. Further, it is apparent that settled aggregate particles and scratch marks thereby caused are little.

Further, it is evident that by an addition of fumed titania, fumed zirconia, fumed alumina or fumed silica, the redispersibility is substantially improved, and no settled aggregate particles or no scratch marks thereby caused, are observed. Further, it is apparent that the selectivity can be adjusted by adjusting the amount of fumed titania, fumed zirconia, fumed alumina or fumed silica to be added.

Further, the polished surfaces of the samples were visually observed, whereby no surface defects other than the scratch marks as shown in the Tables, were observed.

As described in the foregoing, according to the present invention, with the polishing composition of the present invention comprising silicon nitride fine powder, an acid and water, the rate for polishing a silicon dioxide film and the selectivity can be improved without forming surface defects on the the surface to be polished. Further, by an addition of at least one member selected from the group consisting of fumed titania, fumed zirconia, fumed alumina and fumed silica, the redispersibility of the settled polishing agent after storage for a long period of time can be improved, whereby it is possible to prevent formation of settled aggregate particles. Further, it is thereby possible to prevent formation of scratch marks on the surface to be polished and to lower the rate for polishing a silicon nitride film, and the selectivity can be adjusted by adjusting the amount of such addition.

What is claimed is:

1. A polishing composition comprising silicon nitride fine powder, at least one member selected from the group consisting of fumed titania, fumed zirconia and fumed silica, water and an acid, wherein the silicon nitride fine powder has a mean primary particle size of from 0.01 to 10 μm.

2. The polishing composition according to claim 1, wherein the acid is a carboxylic acid.

3. The polishing composition according to claim 2, wherein the acid is selected for the group consisting of gluconic acid, lactic acid, citric acid, tartaric acid, malic acid, glycolic acid, malonic acid, formic acid and oxalic acid.

4. The polishing composition according to claim 1, wherein the acid is hydrochloric acid or nitric acid.

5. The polishing composition according to claim 1, wherein the content of the silicon nitride fine powder is from 0.1 to 50 wt %, the content of water is from 30 to 99.899 wt %, and the content of the acid is from 0.001 to 20 wt %.

6. The polishing composition according to claim 1, wherein the content of at least one member selected from the group consisting of fumed titania, fumed zirconia, and fumed silica, is at most 50 wt %, based on the weight of the polishing composition.

7. A method for planarization polishing a semiconductor which comprises polishing said semiconductor with the polishing composition of claim 1.

* * * * *